US011002584B2

(12) United States Patent
Gillett (10) Patent No.: US 11,002,584 B2
(45) Date of Patent: May 11, 2021

(54) VOLUME MEASUREMENT APPARATUS

(71) Applicant: Shuttle Gauge IP Pty Ltd, Bencubbin (AU)

(72) Inventor: Nicholas Ross Gillett, Bencubbin (AU)

(73) Assignee: Shuttle Gauge IP Pty Ltd, Bencubbin WA (AU)

( * ) Notice: Subject to any disclaimer, the term of this patent is extended or adjusted under 35 U.S.C. 154(b) by 689 days.

(21) Appl. No.: 15/751,394

(22) PCT Filed: Aug. 8, 2016

(86) PCT No.: PCT/AU2016/000270
§ 371 (c)(1),
(2) Date: Feb. 8, 2018

(87) PCT Pub. No.: WO2017/024332
PCT Pub. Date: Feb. 16, 2017

(65) Prior Publication Data
US 2018/0245964 A1   Aug. 30, 2018

(30) Foreign Application Priority Data

Aug. 12, 2015 (AU) ................................ 2015905426
Mar. 15, 2016 (AU) ................................ 2016900961

(51) Int. Cl.
*G01F 23/02* (2006.01)
*B65D 90/48* (2006.01)
(Continued)

(52) U.S. Cl.
CPC ......... *G01F 23/02* (2013.01); *B65D 77/0466* (2013.01); *B65D 90/48* (2013.01); *G01F 19/00* (2013.01); *G01F 25/00* (2013.01)

(58) Field of Classification Search
CPC .......... G01F 23/02; G01F 25/00; G01F 19/00; B65D 77/0466; B65D 90/48
See application file for complete search history.

(56) References Cited

U.S. PATENT DOCUMENTS

| 47,824 A | * | 5/1865 | Horton ..................... B25H 7/04 33/42 |
| 291,728 A | * | 1/1884 | Hester ..................... B25H 7/04 33/42 |

(Continued)

FOREIGN PATENT DOCUMENTS

| CN | 2056506 U | 4/1990 |
| GB | 870801 | 6/1961 |

OTHER PUBLICATIONS

International Search Report, PCT/AU2016/000270, dated Nov. 14, 2016.

(Continued)

*Primary Examiner* — Nimeshkumar D Patel
*Assistant Examiner* — Tania Courson
(74) *Attorney, Agent, or Firm* — Andrus Intellectual Property Law, LLP (57) ABSTRACT

A volume measurement apparatus is for a storage container and has an elongated member having a measurement scale marked thereon and an attachment mechanism configured to attach the elongated member onto a storage container. The storage container is capable of holding a liquid or granular substance. The volume measurement apparatus further has an adjustment mechanism configured such that a position and orientation of the elongated member can be adjusted relative to the storage container to align a minimum or maximum capacity marker on the measurement scale with a topmost level of the substance held in the storage container. The measurement scale is adapted such that it can be used to measure a volume of the substance held in the storage container.

17 Claims, 7 Drawing Sheets

(51) Int. Cl.
  *G01F 25/00*  (2006.01)
  *B65D 77/04*  (2006.01)
  *G01F 19/00*  (2006.01)

(56) References Cited

U.S. PATENT DOCUMENTS

| | | | | |
|---|---|---|---|---|
| 379,692 | A * | 3/1888 | Elliott | G01F 23/04 33/723 |
| 645,875 | A * | 3/1900 | Straus | G01F 19/00 73/428 |
| 750,221 | A * | 1/1904 | Reis | B25H 7/04 33/42 |
| 1,172,810 | A * | 2/1916 | Lewandowski | G01B 3/04 33/485 |
| 1,528,539 | A * | 3/1925 | Fleckenstein | B67D 7/08 73/428 |
| 2,213,026 | A * | 8/1940 | Hoffman | G01F 23/04 33/723 |
| 2,607,122 | A * | 8/1952 | Overmyer | G01F 23/04 33/723 |
| 2,679,104 | A * | 5/1954 | Whitton | B26D 3/085 33/42 |
| 2,818,644 | A * | 1/1958 | Crawford | G01B 3/20 30/293 |
| 2,942,349 | A * | 6/1960 | Zachos | G01F 23/292 33/723 |
| 3,006,314 | A * | 10/1961 | Malec | G01F 23/04 116/227 |
| 3,160,957 | A * | 12/1964 | Phillips | B43L 7/08 33/485 |
| 4,388,761 | A * | 6/1983 | Henderson | B43L 13/028 33/42 |
| 4,445,370 | A * | 5/1984 | Whitmire | F01M 3/00 116/227 |
| 4,550,602 | A | 11/1985 | Burke et al. | |
| 4,965,941 | A * | 10/1990 | Agostinacci | G01B 3/1084 33/668 |
| 5,231,764 | A * | 8/1993 | Chang | B26B 29/06 30/293 |
| 5,566,465 | A * | 10/1996 | Zoellner | B44D 3/08 33/572 |
| 6,575,336 | B1 | 6/2003 | Bayer | |
| 7,178,246 | B2 * | 2/2007 | McCallum | B26B 5/005 30/293 |
| 7,231,720 | B2 * | 6/2007 | Allen | B25H 7/04 33/41.6 |
| 8,256,130 | B2 * | 9/2012 | Jantz | A23L 5/11 33/679.1 |
| D703,564 | S * | 4/2014 | Steffahn | D10/101 |
| 9,528,870 | B2 * | 12/2016 | Romweber | G01F 23/0007 |
| 9,903,747 | B2 * | 2/2018 | Rizun | G01F 19/005 |
| D856,836 | S * | 8/2019 | Gillett | D10/101 |

OTHER PUBLICATIONS

Written Opinion, PCT/AU2016/000270, dated Nov. 14, 2016.
International Preliminary Report on Patentability, PCT/AU2016/000270, dated May 31, 2017.

* cited by examiner

VOLUME MEASUREMENT APPARATUS

CROSS-REFERENCE TO RELATED APPLICATIONS

This application is the U.S. national stage application of International Application PCT/AU2016/000270, filed Aug. 8, 2016, which international application was published on Feb. 16, 2017, as International Publication WO 2017/024332 in the English language. The International Application claims priority of Australian Patent Application No. 2015905426 filed Aug. 12, 2015 and Australian Patent Application No. 2016900961 filed Mar. 15, 2016. The international application and Australian applications are all incorporated herein by reference, in entirety.

FIELD OF INVENTION

The present invention relates to a volume measurement apparatus for storage containers. More particularly, but not exclusively, the present invention relates to a volume measurement apparatus for storage containers adapted to hold liquid and granular substances.

BACKGROUND ART

Containers of various forms are used in industry for storing and transporting materials and substances. In the agricultural industry, for example, large reusable containers known as intermediate bulk containers (IBCs) are used for the transportation and storage of chemicals, solvents and agricultural products in liquid and granular form.

Intermediate bulk containers typically consist of a rectangular-shaped storage vessel made of a semi-translucent plastic material, such as polyethylene, which holds a substance to be stored or transported. The storage vessel is housed inside a galvanized iron supporting cage which, when being transported, is placed on top of a wooden pallet. The supporting cage provides structural rigidity and protects the storage vessel from impacts when the container is being moved by, for example, forklift truck or pallet jack. The supporting cage also enables multiple containers to be stacked vertically on top of one another for increasing aggregate storage capacity.

To allow the volume of liquid, or other substance, contained in the intermediate bulk container to be measured, the container's storage vessel has one or more measurement scales marked on the surfaces of its internal and/or external side walls. An operator of the container measures the volume by comparing the level of the top surface of the liquid or substance with the scale through the semi-translucent walls of the storage vessel.

Accurate measurements can only be taken using these marked scales if the container is resting on an even surface at an angle that is perpendicular to the ground. Further, these scales have a fixed resolution only which makes them inflexible in use. The resolution may be too low to provide the level of accuracy that is required. Equally, in some cases, the resolution marked on the storage vessel may be too high, meaning that significant time is required to take each reading, which is impractical. Marked scales can be inaccurate or vague or become illegible as a result of erosion or staining through prolonged use.

It is, therefore, common to decant or transfer a liquid or substance stored in an intermediate bulk container into a separate container of known dimensions, or that has a marked measurement scale of sufficient resolution and accuracy, in order to take volume measurements. Double handling of the substances in this manner, however, wastes time and can increase operator exposure to harmful chemicals.

It is, therefore, also known to use separate automated volume measurement devices. These include automated level sensors utilising floatation devices or electrical conduction sensors and electronic flow meters. These devices and methods are, however, difficult to operate and require frequent re-calibration. They are also expensive and suffer from some of the same shortfalls of conventional manual measurement methods as mentioned above.

The present invention attempts to overcome, at least in part, the aforementioned disadvantages of previous volume measurement devices and methods.

SUMMARY OF THE INVENTION

In accordance with one aspect of the present invention, there is provided a volume measurement apparatus for a storage container, comprising:

an elongated member having a measurement scale marked thereon;

an attachment mechanism configured to attach the elongated member onto a storage container, where the storage container is capable of holding a liquid or granular substance; and an adjustment mechanism configured such that a position and orientation of the elongated member can be adjusted relative to the storage container in order to align a minimum or maximum capacity marker on the measurement scale with a topmost level of the substance held in the storage container, whereby the measurement scale is adapted such that it can be used to measure a volume of the substance held in the storage container.

The elongated member may consist of an elongated measuring bar.

The adjustment mechanism may comprise an elongated adjustment slot formed in the measuring bar, a nut and a bolt, wherein:

the adjustment slot slidably receives the bolt; and
the nut and bolt are configured to attach the measuring bar removably to the
attachment mechanism.

The nut may be a wingnut.

The attachment mechanism may comprise a hook.

The hook may be an L-shaped hook.

The hook may be made from a metallic material.

The adjustment slot and hook may each be disposed substantially at a first end of the measuring bar.

The measuring bar may have a cross sectional shape that is substantially rectangular.

The cross sectional shape of the measuring bar may be substantially circular.

The measuring bar may be made of a metallic material.

The measuring bar may be made of laser-cut stainless steel.

The measuring bar may be made of plastic.

The measurement scale may be marked on the measuring bar using a plurality of notches cut into the measuring bar.

The measurement scale may be marked on the measuring bar using paint.

The volume measurement apparatus may further comprise a pen attached to the volume measurement apparatus by a wire or cable, wherein the pen is configured to mark volume measurement levels on the storage container in use.

The attachment mechanism and adjustment mechanism may consist of a pair of adhesive strips affixed to, respectively, the measuring bar and the storage container.

Each adhesive strip may substantially comprise a hook and loop fastener material.

Each adhesive strip may substantially comprise a glue-based adhesive substance.

The attachment and adjustment mechanism may consist of a pair of complimentary magnets affixed to, respectively, the measuring bar and the storage container.

The attachment mechanism may be configured to attach the measuring bar onto an intermediate bulk container, wherein the intermediate bulk container comprises a container vessel and a supporting cage.

The attachment mechanism may be configured to attach the measuring bar to the supporting cage of the intermediate bulk container.

The attachment mechanism may be configured to attach onto a horizontal bar of the supporting cage of the intermediate bulk container.

The attachment mechanism may be configured to attach onto an uppermost horizontal bar of the supporting cage of the intermediate bulk container.

The elongated member may consist of a flexible measuring tape.

BRIEF DESCRIPTION OF DRAWINGS

An embodiment of the disclosure will now be described, by way of example, with reference to the accompanying drawings, in which.

DETAILED DESCRIPTION OF THE DRAWINGS

Figure 1:
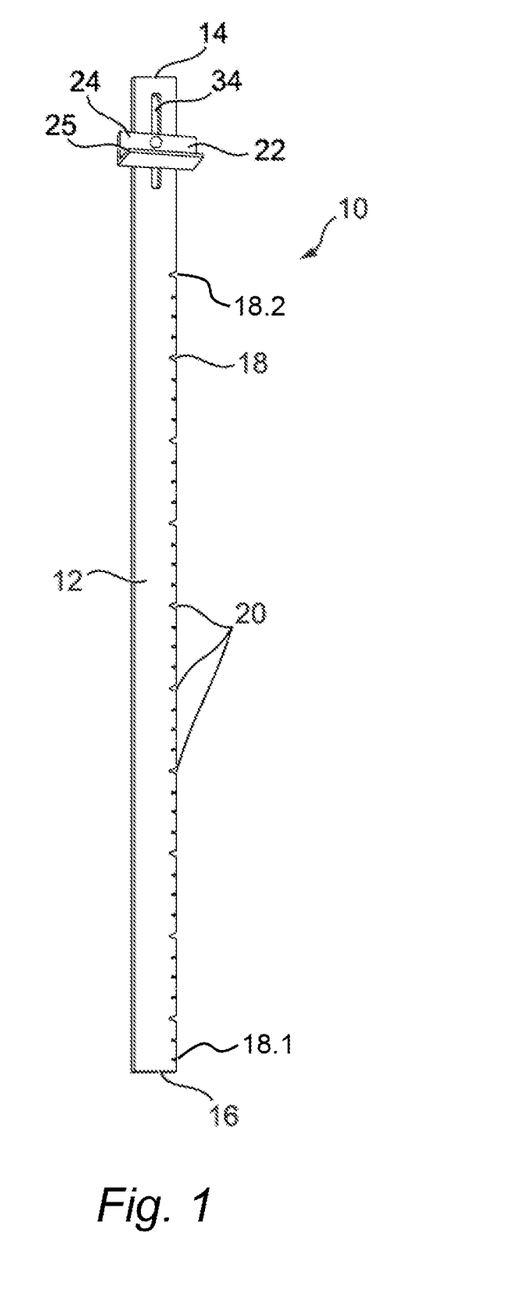
FIG. 1 is an elevated front view of a volume measurement apparatus according to a first embodiment of the present invention.
Figure 2:
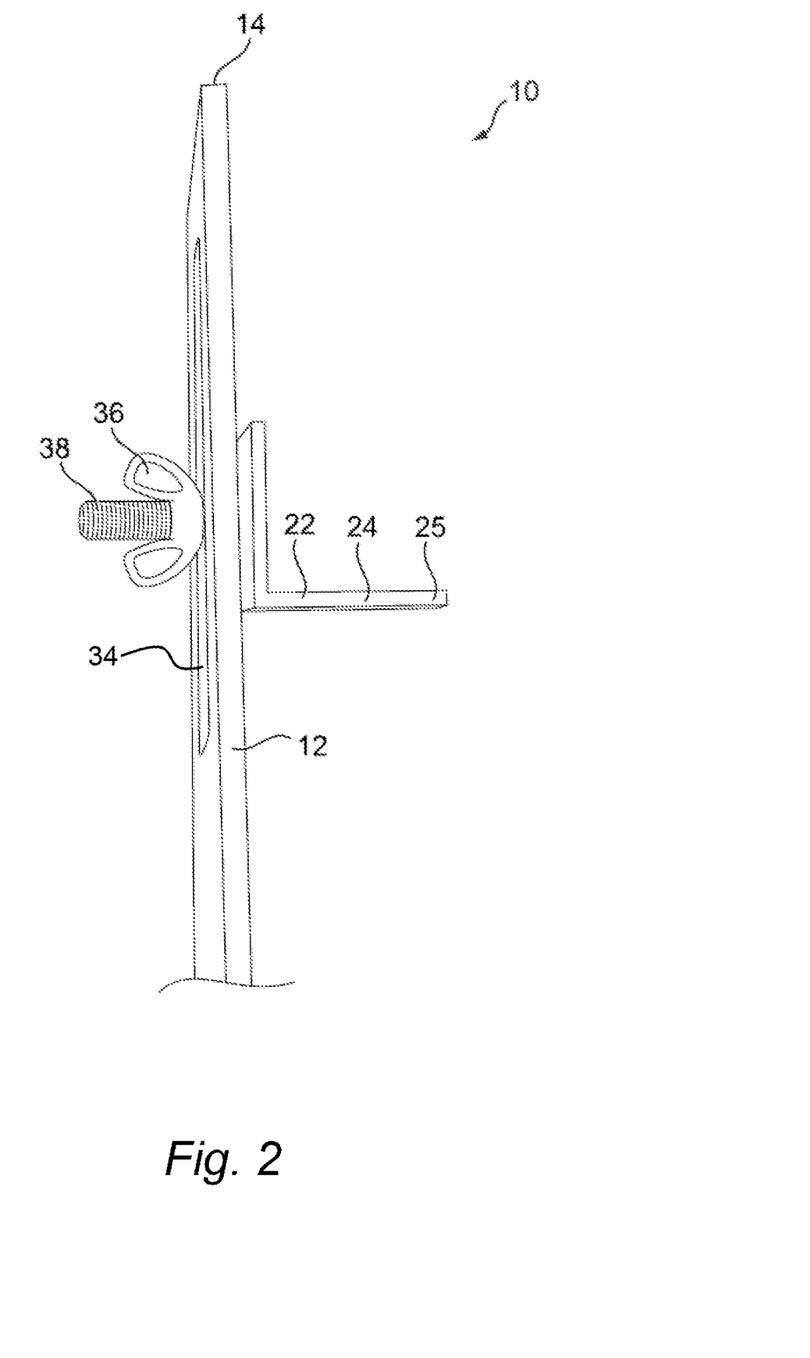
FIG. 2 is a partial side view of an end of the volume measurement apparatus of FIG. 1.

Referring to FIGS. 1 and 2, there is shown a volume measurement apparatus 10 for a storage container according to a first embodiment of the present invention. The apparatus 10 comprises an elongated member 12 having a measurement scale 18 marked thereon and an attachment mechanism 22 configured to attach the elongated member 12 onto a storage container (not shown) capable of holding a liquid or granular substance. The apparatus 10 further comprises an adjustment mechanism 34 configured such that a position and orientation of the elongated member 12 can be adjusted relative to the storage container to align minimum or maximum capacity markers 18.1,18.2 on the measurement scale 18 with a topmost level of the substance held in the storage container. The measurement scale 18 is adapted such that it can be used to measure a volume of the substance held in the storage container.

More particularly, the elongated member 12 consists of an elongated metallic measuring bar 12 having a first end 14 and a second end 16. The measurement scale 18 is marked on the measuring bar 12 using a plurality of notches 20 each cut into the measuring bar 12. The notches 20 advantageously enable the measurement scale 18 to be viewed and read easily from multiple angles, and from a significant distance away from the volume measurement apparatus 10.

In alternative embodiments of the present invention, the measurement scale 18 is marked on the measuring bar 12 using other suitable means such as, for example, paint or ink or by affixing a separate scale to one or more surfaces of the measuring bar 12.

Figure 3:
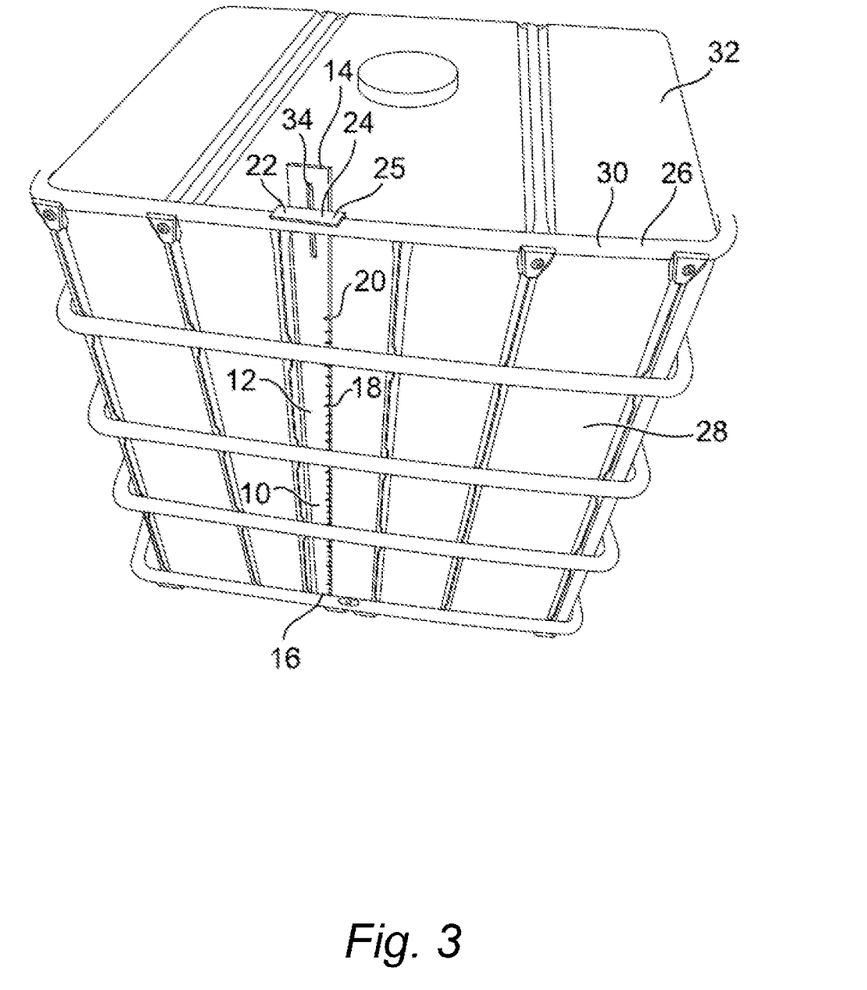
FIG. 3 is a perspective view of the volume measurement apparatus of FIG. 1, wherein the apparatus is shown attached to a supporting cage of an intermediate bulk container.
Figure 4:
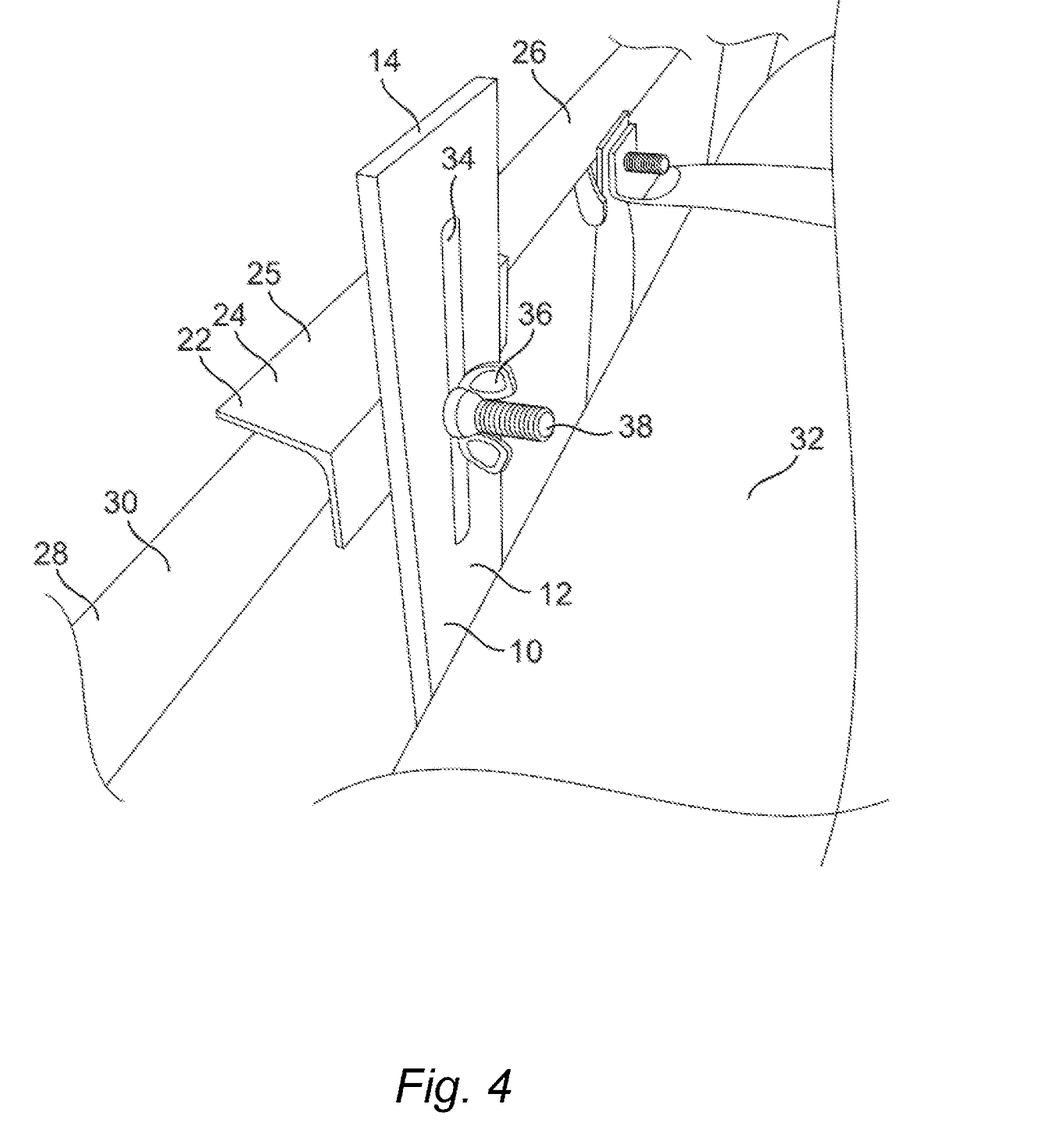
FIG. 4 is a partial further perspective view of the arrangement shown in FIG. 3.

Referring to FIGS. 3 and 4, there is shown the volume measurement apparatus 10 wherein the apparatus 10 has been attached onto an intermediate bulk container 28. The attachment mechanism 22 comprises a hook 24 that is configured such that the measuring bar 12 can, more particularly, be attached removably to the supporting cage 26 of the intermediate bulk container 28.

Preferably, the hook 24 is an L-shaped metallic hook 25 that attaches the measuring bar 12 removably to an uppermost horizontal supporting bar 30 of the supporting cage 26.

The adjustment mechanism 34 is configured such that a position and/or orientation of the measuring bar 12 can be adjusted relative to the container vessel 32 of the intermediate bulk container 28.

The adjustment mechanism 34 preferably comprises an adjustment slot 34 formed as an elongated aperture in the measuring bar 12 substantially at its first end 14. As most clearly illustrated in FIGS. 2 and 4, the adjustment mechanism 34 further comprises a nut 36 and complementary bolt 38. Preferably, the nut 36 is a wingnut.

The bolt 38 passes through the adjustment slot 34 and the hook 24 and is used, in combination with the nut 36, to removably fasten the hook 24 to the measuring bar 12. Tightening the nut 36 increases the strength of the fastening of the hook 24 to the measuring bar 12.

In use, to adjust the height of the measuring bar 12 relative to the container vessel 32, the nut 36 is firstly loosed by an operator. The operator then adjusts the height of the measuring bar 12, which causes the bolt 38 to slide along the adjustment slot 34, until the desired height is reached. The operator may then tighten the nut 36 to secure the measuring bar 12 in position.

The hook 24 may freely revolve about the bolt 38 when the nut 36 has been loosened, which allows the operator to adjust the alignment or tilt angle of the hook 24 relative to the measuring bar 12. For example, in FIGS. 1 and 2, the hook 24 is shown arranged such that a base end of the L-shaped hook is disposed towards the second end 16 of the measuring bar 12. In FIGS. 3 and 4, however, the hook 24 has been inverted and the base end of the L-shaped hook is disposed towards the first end 14 of the measuring bar 12 so that they hook 24 may attach onto the uppermost horizontal supporting bar 30 of the supporting cage 26.

The measuring bar 12 is made from a rigid material and may comprise, for example, a metallic material or hard plastic material. Preferably, the measuring bar 12 is made from a laser-cut stainless steel material.

In the embodiment of the invention that is illustrated in FIGS. 1 to 4, the measuring bar 12 has a cross sectional shape that is substantially rectangular. It will be appreciated, however, that alternative cross sectional shapes are possible and are within the scope of the present invention. For example, the cross sectional shape may be, without limitation, substantially circular.

In use, the volume measurement apparatus 10 is attached, via its hook 24, to the supporting cage 26 of the intermediate bulk container 28 containing the fluid or granulated substance being stored and/or transported. The nut 36 and adjustment slot 34 are then used by an operator to adjust the height and alignment of the measuring bar 12, as necessary and appropriate, relative to the container vessel 32 of the intermediate bulk container 28.

The measuring bar 12 will be adjusted, using the adjustment mechanism of the apparatus 10, until a starting point or maximum capacity marker 18.2 on the measurement scale 18 is aligned level with the fluid or substance contained in the container vessel 32 and until the elongated length of the measuring bar 12 is aligned with the gravitational vertical.

Once properly positioned and aligned, the operator may also then, optionally, use a pen attached to the volume measurement apparatus 10 by a wire or cable (not shown) to mark off the starting point on a wall of the container vessel 32.

A quantity of the liquid or substance may then be extracted from the container vessel 32, as is required. The volume measurement apparatus 10 provides a convenient scale which the operator uses to read the top level of the liquid or substance and provides an accurate indication of the volume of liquid or substance remaining in the container vessel 32 (and, respectively, the volume that has been extracted) at any given point in time.

The minimum capacity marker 18.1 may be used in a similar manner in situations when the volume measurement apparatus 10 is used to measure the volume of liquid or other substance being filled into the container vessel 32.

The volume measurement apparatus 10 provides a flexible solution that may be used with a range of different storage containers, including intermediate bulk containers. The apparatus 10 provides that operators are not limited to using a scale marked on the walls of the container vessel 32, which may be inaccurate, have an inadequate resolution or be illegible.

It will be appreciated that the resolution of the scale 18 marked on the measuring bar 12 will be adapted for specific types of storage container. A user may, therefore, have a number of the apparatuses 10, each having different scales, selectable on a case-by-case basis.

For example, for container operations in which the importance of speed and efficiency prevails over that of accuracy, a volume measurement apparatus 10 having a low resolution measurement scale 18 may be selected and used so that volume measurements may be taken quickly and easily for a large number of containers. Equally, a volume measurement apparatus 10 having a high resolution measurement scale 18 may be selected and used for containers where accuracy is of paramount importance; for example, when the container holds a powerful chemical substance for agricultural use.

In the event that an intermediate bulk container 28 is moved or re-orientated while stored liquid or substance has not been completely extracted from its container vessel 32, the volume measurement apparatus 10 may, advantageously, continue to be used to take volume measurements. An operator may simply loosen the nut 36 and adjust the measurement scale 18 so that it is re-aligned with the gravitational vertical before continuing to take measurements.

Figure 5:
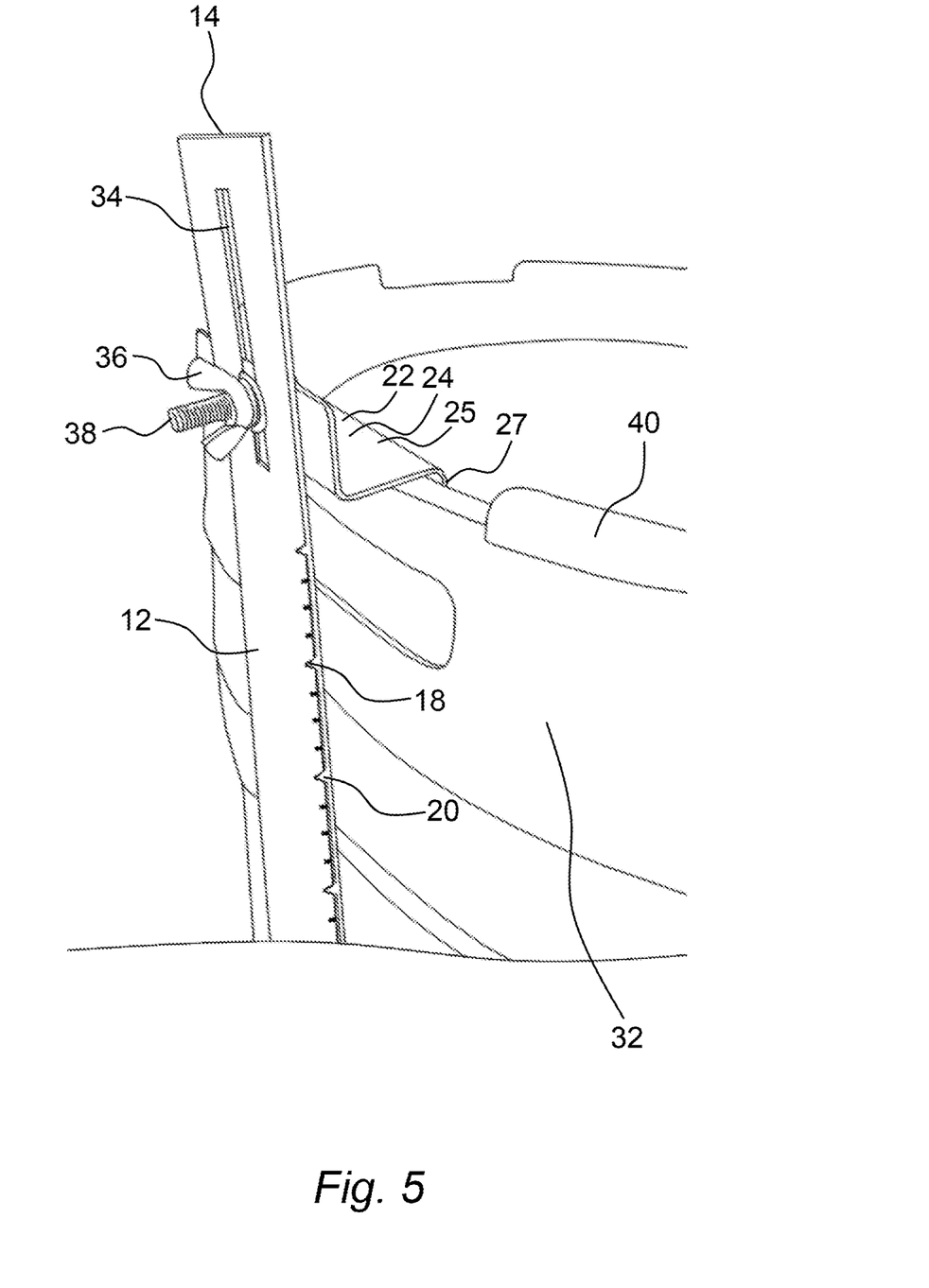
FIG. 5 is a partial perspective view of the volume measurement apparatus of FIG. 1, wherein the apparatus is shown attached directly onto a storage container.

The measuring bar 12 of the volume measurement apparatus 10 does not necessarily have to be attached to the supporting cage 26. As is illustrated in FIG. 5, for example, the measuring bar 12 may alternatively be attached directly onto a container vessel 32 that is standalone and that does not have a supporting cage surrounding it. In this configuration, the hook 24 of the volume measurement apparatus 10 hooks over and onto an outer rim 40 of the container vessel 32. The hook 24, preferably, has a bent end portion 27 configured to engage the outer rim 40 securely.

Figure 6:
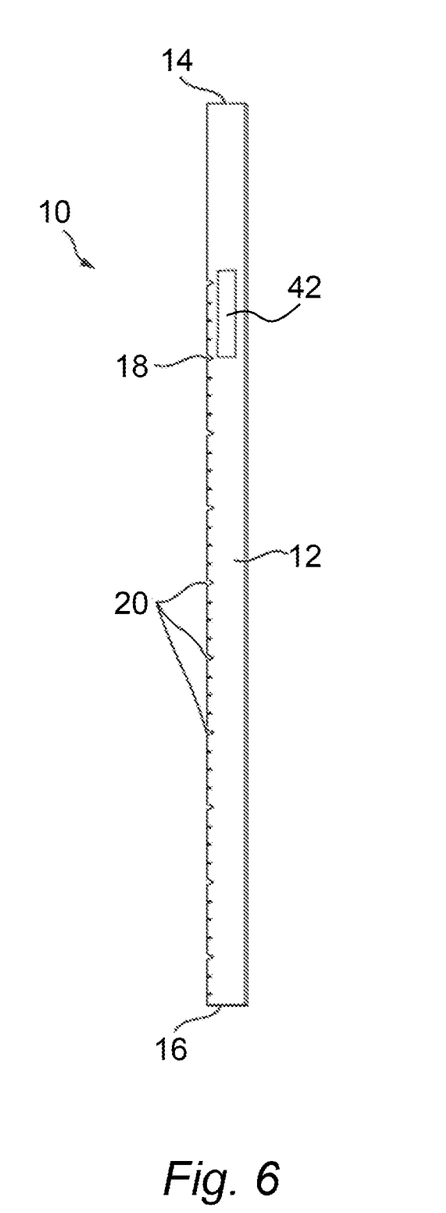
FIG. 6 is an elevated front view of a volume measurement apparatus according to a second embodiment of the present invention.

Referring to FIG. 6, there is shown a second embodiment of a volume measurement apparatus 10. The embodiment is identical in all material respects to the first embodiment shown in FIGS. 1 and 2 save that the attachment mechanism and adjustment mechanism used in this embodiment consists of a single adhesive strip 42 that is affixed to the measuring bar 12.

Figure 7:
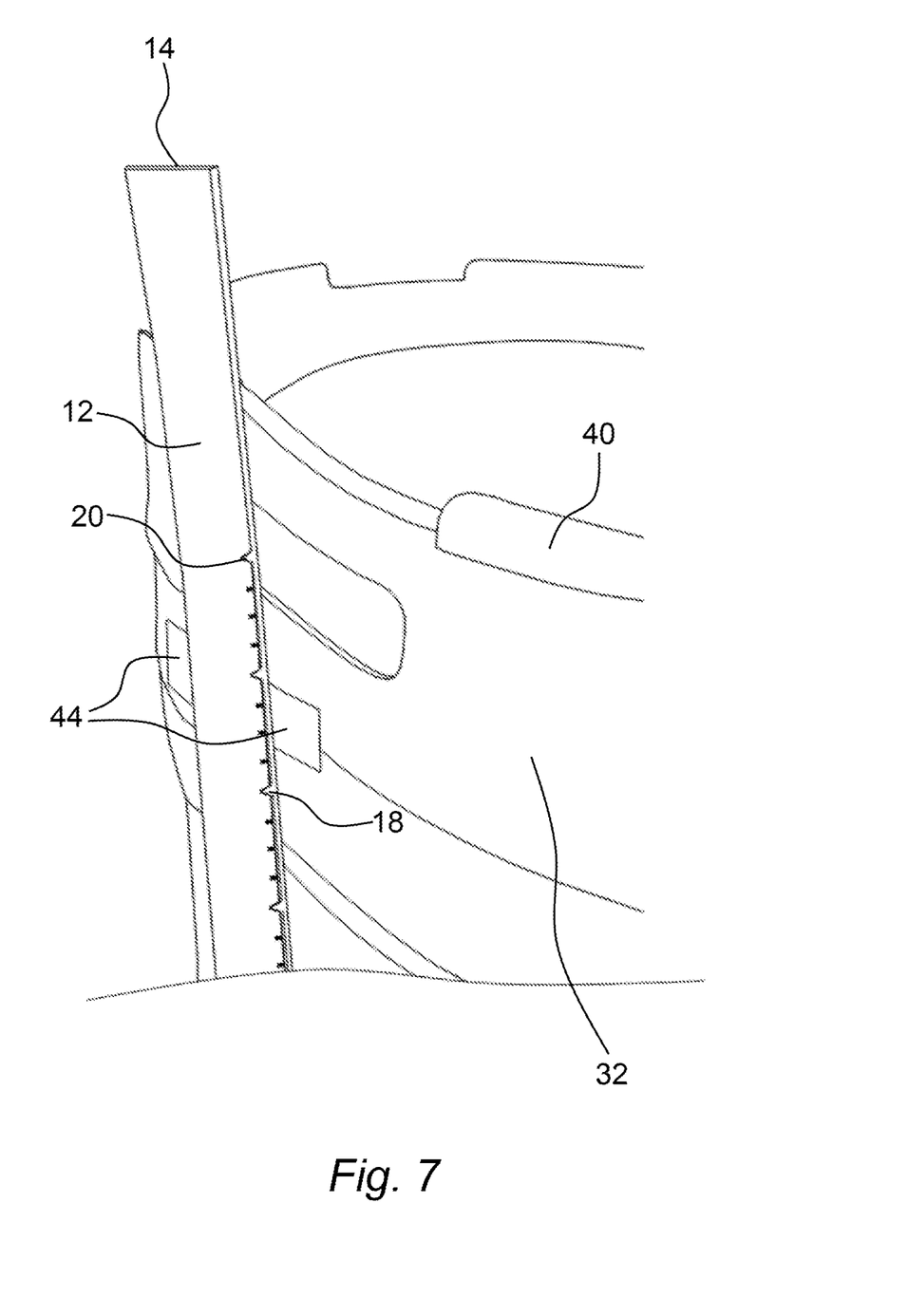
FIG. 7 is a partial perspective view of the volume measurement apparatus of FIG. 6, wherein the apparatus is shown attached directly onto a storage container.

As shown in FIG. 7 a further, complementary, adhesive strip 44 is affixed onto the container vessel 32.

In use, the container vessel's 32 adhesive strip 44 engages with the measuring bar's 12 adhesive strip 42 for the purpose of attaching the measuring bar 12 to the container vessel 32.

The pair of adhesive strips 42, 44 each, preferably, substantially comprise a releasably fastening hook and loop material. Alternatively, the strips 42, 44 each comprise a glue-based adhesive substance.

The strips 42, 44 allow the position and alignment of the measuring bar 12 to be adjusted relative to the position and alignment of the container vessel 32 in the same manner as described above for the first disclosed embodiment.

The attachment and adjustment mechanisms used in the present invention are not limited to the embodiments illustrated in the Figures. In alternative embodiments, for example, the attachment and adjustment mechanisms may consist of a pair of complimentary magnets affixed to, respectively, the measurement bar 12 and the storage container vessel 32.

The elongated member 12 that is used in the present invention is, similarly, not limited to the elongated measuring bar 12 illustrated in the Figures. In alternative embodiments, for example, the elongated member 12 may consist of an elongated measuring tape made of a flexible plastic or fabric material.

Further modifications and variations as would be apparent to a skilled addressee are deemed to be within the scope of the present invention.

In the claims that follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

The invention claimed is:

1. A volume measurement apparatus for a storage container, comprising:
   an elongated member having a measurement scale marked thereon for measuring a volume of a liquid or granular substance held in the storage container;
   an attachment mechanism configured to attach the elongated member onto the storage container, or to a supporting structure of the storage container, such that the elongated member extends down an external side of the storage container;
   an adjustment mechanism for adjusting a position and a tilt angle of the elongated member relative to the storage container, the adjustment mechanism comprising a bolt extending from the attachment mechanism, an elongated slot formed into the elongated member that slidably receives the bolt and a fastening means attachable to the bolt;

wherein the adjustment mechanism is configured such that the elongated member may be tilted relative to the attachment mechanism to thereby adjust the tilt angle of the elongated member relative to the storage container such that the elongated member is orientated perpendicularly to a topmost level of the substance held in the storage container; and a vertical position of the elongated member may be raised or lowered relative to the topmost level of the substance such that a minimum or maximum capacity marker on the measurement scale is vertically aligned with the topmost level, and wherein the fastening means is configured to secure the elongated member in place relative to the attachment mechanism such that the position and tilt angle of the elongated member relative to the storage container are fixed once the elongated member is fully adjusted.

2. The volume measurement apparatus according to claim 1, wherein the fastening means is a nut.

3. The volume measurement apparatus according to claim 2, wherein the nut is a wingnut.

4. The volume measurement apparatus according to claim 1, wherein the elongated member comprises an elongated measuring bar.

5. The volume measurement apparatus according to claim 4, wherein the measuring bar has a cross sectional shape that is substantially rectangular.

6. The volume measurement apparatus according to claim 4, wherein the measurement scale is marked on the measuring bar using a plurality of notches cut into the measuring bar.

7. The volume measurement apparatus according to claim 4, wherein the measurement scale is marked on the measuring bar using paint.

8. The volume measurement apparatus according to claim 1, wherein the attachment mechanism comprises a hook.

9. The volume measurement apparatus according to claim 8, wherein the hook is an L-shaped hook.

10. The volume measurement apparatus according to claim 8, wherein the hook is made from a metallic material.

11. The volume measurement apparatus according to claim 8, wherein the adjustment slot and hook are each disposed substantially at a first end of the measuring bar.

12. The volume measurement apparatus according to claim 1, wherein the attachment mechanism is configured such that the elongated member is attachable onto a supporting cage of an intermediate bulk container.

13. The volume measurement apparatus according to claim 12, wherein the attachment mechanism is configured such that the elongated member is attachable onto a horizontal bar of the supporting cage of the intermediate bulk container.

14. The volume measurement apparatus according to claim 13, wherein the attachment mechanism is configured such that the elongated member is attachable onto an uppermost horizontal bar of the supporting cage of the intermediate bulk container.

15. The volume measurement apparatus according to claim 1, wherein the elongated member is made of a metallic material.

16. The volume measurement apparatus according to claim 1, wherein the elongated member is made of laser-cut stainless steel.

17. The volume measurement apparatus according to claim 1, wherein the elongated member is made of plastic.

* * * * *